US 7,132,550 B2

(12) United States Patent
Tao et al.

(10) Patent No.: US 7,132,550 B2
(45) Date of Patent: Nov. 7, 2006

(54) PROCESS FOR THE PREPARATION OF CYANINE DYES WITH POLYSULFONATE ANIONS

(75) Inventors: Ting Tao, Fort Collins, CO (US); Eduard Kottmair, Ebenhausen (DE); Scott A. Beckley, Windsor, CO (US)

(73) Assignee: Eastman Kodak Company, Rochester, NY (US)

( * ) Notice: Subject to any disclaimer, the term of this patent is extended or adjusted under 35 U.S.C. 154(b) by 520 days.

(21) Appl. No.: 10/722,257

(22) Filed: Nov. 25, 2003

(65) Prior Publication Data

US 2005/0113546 A1    May 26, 2005

(51) Int. Cl.
*C07D 209/10*    (2006.01)
*G03C 1/00*    (2006.01)

(52) U.S. Cl. .................................... 548/469; 430/270.1
(58) Field of Classification Search ................. 548/469
See application file for complete search history.

(56) References Cited

U.S. PATENT DOCUMENTS

| 5,330,884 A | 7/1994 | Fabricius et al. |
| 5,397,690 A | 3/1995 | Fabricius et al. |
| 6,159,657 A | 12/2000 | Fleming et al. |

FOREIGN PATENT DOCUMENTS

| EP | 0591820 A1 | 4/1994 |
| JP | 10-226170 | 8/1998 |
| JP | 11-119421 | 4/1999 |
| JP | 2001-277718 | 10/2001 |

*Primary Examiner*—Kamal A. Saeed
*Assistant Examiner*—Jason M. Nolan

(57) ABSTRACT

A convenient and economical method for preparing infrared absorbing cyanine dyes useful in lithographic printing plate precursors is disclosed. The reaction is generally carried out by condensation of a heterocyclic base containing an activated methylene group and an unsaturated bisaldehyde or its equivalent in a solvent or solvent mixture at about 20–150° C. All the reactions necessary for production of the infrared absorbing cyanine dye may be carried out in one reaction vessel without isolating any intermediate products.

19 Claims, No Drawings

PROCESS FOR THE PREPARATION OF CYANINE DYES WITH POLYSULFONATE ANIONS

FIELD OF THE INVENTION

The invention relates to lithographic printing. In particular, this invention relates to a convenient and economical method for preparing infrared absorbing cyanine dyes useful in lithographic printing plate precursors.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically comprise an imageable layer applied over the hydrophilic surface of a substrate. The imageable layer includes one or more radiation-sensitive components, which may be dispersed in a suitable binder. Alternatively, the radiation-sensitive component can also be the binder material. Following imaging, either the imaged regions or the unimaged regions of the imageable layer are removed by a suitable developer, revealing the underlying hydrophilic surface of the substrate. If the imaged regions are removed, the precursor is positive working. Conversely, if the unimaged regions are removed, the precursor is negative working. In each instance, the regions of the imageable layer (i.e., the image areas) that remain are ink-receptive, and the regions of the hydrophilic surface revealed by the developing process accept water and aqueous solutions, typically a fountain solution, and repel ink.

Imaging of the imageable element with ultraviolet and/or visible radiation is typically carried out through a mask, which has clear and opaque regions. Imaging takes place in the regions under the clear regions of the mask but does not occur in the regions under the opaque regions. However, direct digital imaging, which obviates the need for imaging through a mask, is becoming increasingly important in the printing industry. Imageable elements for the preparation of lithographic printing plates have been developed for use with infrared lasers. Thermally imageable elements are disclosed, for example, in Shimazu, U.S. Pat. No. 6,294,311, U.S. Pat. No. 6,352,812, and U.S. Pat. No. 6,593,055; Patel, U.S. Pat. No. 6,352,811; Savariar-Hauck, U.S. Pat. No. 6,358,669, U.S. Pat. No. 6,528,228; West, U.S. Pat. No. 6,090,532; Parsons, U.S. Pat. No. 6,280,899; McCullough, U.S. Pat. Pub. No. 2002/0136961; and WO99/21715; Haley, U.S. Pat. No. 5,372,907; Nguyen, U.S. Pat. No. 5,919,601; Kobayashi, U.S. Pat. No. 5,965,319; Busman, U.S. Pat. No. 5,763,134; and WO 00/17711.

Thermally imageable elements that are to be imaged with infrared radiation, such as with a laser or an array of lasers emitting modulated near infrared or infrared radiation in the range of about 800 nm to about 1200 nm, typically about 830 nm, about 1056 nm, or about 1064 nm, typically comprise an infrared absorber known as a photothermal conversion material. Photothermal conversion materials absorb radiation and convert it to heat.

U.S. patent application Ser. No. 10/384,989, filed Mar. 10, 2003, the disclosure of which is incorporated herein by reference, discloses thermally imageable elements in which the photothermal conversion material is a cyanine dye in which the anion is polysulfonate anion. When these dyes are used as photothermal conversion materials in imageable elements, especially in negative working imageable elements in which the imageable layer comprises a photothermal conversion material, an acid generator, an acid activatable crosslinking agent, and a polymeric binder, the resulting printing plates have improved dot stability. However, these dyes are difficult to prepare and must be prepared by multistep syntheses. Thus, a need exists for a more convenient method for preparing these dyes.

SUMMARY OF THE INVENTION

The invention is a method for preparing an infrared absorbing cyanine dye of the structure:

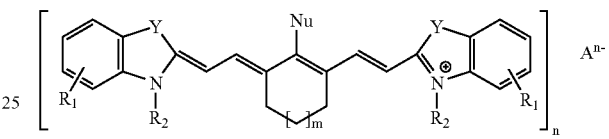

in which $R_1$ is hydrogen, or $R_1$ is one or more alkyl, aralkyl, alkoxy, carboxyl, nitro, cyano, trifluoromethyl, acyl, alkyl sulfonyl, aryl sulfonyl, or halogen groups, or $R_1$ is the atoms necessary to form a substituted or unsubstituted benzo group;

$R_2$ is alkyl, aryl, or aralkyl;

Nu is halogen, substituted or unsubstituted phenoxy, substituted or unsubstituted thiophenoxy, or substituted or unsubstituted diphenylamino;

Y is O, S, NR', or $C(R')_2$, where R' is hydrogen or alkyl;

m is zero or one;

n is two, three, or four; and

A is an aromatic group that has n sulfonate groups.

The method comprises the steps of:

a) reacting an activated methylene group containing a heterocyclic base of the structure:

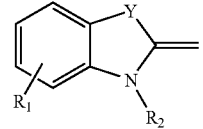

with a compound of the structure:

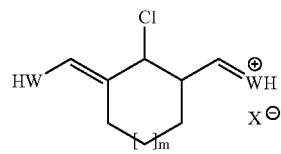

and forming an intermediate in a reaction mixture;

in which W is O or Ar—N, Ar is an aromatic group, $X^-$ is an anion, and m is zero or one; and b) adding a salt of A to the reaction mixture; and c) isolating the infrared absorbing cyanine dye in which the infrared absorbing cyanine dye is the only compound isolated in the method.

The intermediate is not isolated and/or purified. The method of the invention provides convenient and economical way to synthesize infrared absorbing cyanine dyes in a one-pot reaction because it is unnecessary to isolate and/or purify intermediates during the synthesis.

DETAILED DESCRIPTION OF THE INVENTION

The invention is a one-pot method for preparing infrared absorbing cyanine dyes of Structure I. The cation preferably absorbs infrared radiation, preferably in the range of 700 nm to 1200 nm. The anion has two to four sulfonate groups.

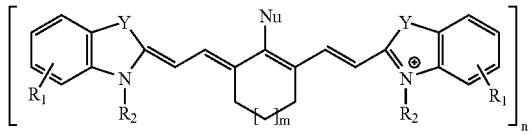

I $R_1$ is preferably hydrogen. However, $R_1$ may be one or more alkyl, aralkyl, alkoxy, carboxyl, nitro, cyano, trifluoromethyl, acyl, alkyl or aryl sulfonyl, or halogen groups, or a combination thereof, or $R_1$ may be the atoms necessary to form a substituted or unsubstituted benzo group.

Typical alkyl groups are alkyl groups of one to twelve carbon atoms, such as 2-methylbutyl, 3-methylbutyl, pentyl, hexyl, heptyl, octyl, nonyl, decyl, undecyl, dodecyl, 4-methylpentyl, 3-methylpentyl, 2-methylpentyl, 2-methylhexyl, 2-ethylpentyl, 5-methylhexyl, 2,2,4-trimethylpentyl, cyclopentyl, cyclohexyl, and alkyl groups of one to four carbon atoms. When $R_1$ is alkyl, the preferred alkyl groups are alkyl groups of one to four carbon atoms, such as methyl, ethyl, cyclopropyl, i-propyl, n-propyl, cyclobutyl, i-butyl, s-butyl, t-butyl, and n-butyl.

Typical alkoxy groups are alkoxy groups of one to twelve carbon atoms, such as methoxy, ethoxy, n-propoxy, i-propoxy, n-butoxy, i-butoxy, s-butoxy, t-butoxy, n-pentoxy, 2,2,dimethylpropoxy, n-hexyloxy, n-heptyloxy, n-octyloxy, n-nonyloxy, and n-decyoxy. When $R_1$ is alkoxy, the preferred alkoxy groups are methoxy and ethoxy.

$R_1$ may be aralkyl group, preferably one containing seven to twelve carbon atoms. An aralkyl is an alkyl group substituted with a substituted or unsubstituted aryl group. Aryl refers to an aromatic cyclic six-membered ring such as a phenyl group or an aromatic 10-membered ring such as a naphthalene group. The aryl groups may be substituted with one of more alkyl, alkoxy, carboxyl, nitro, acyl, alkyl or aryl sulfonyl; trifluoromethyl; or halogen groups, such as are described herein. Typical aryl groups are, for example, phenyl; substituted phenyl, such as 4-methylphenyl(p-tosyl), 3-methylphenyl(m-tosyl), 2-methylphenyl(o-tosyl), 4-methoxyphenyl, 4-chlorophenyl, 4-bromophenyl, 4-cyanophenyl, 4-fluorophenyl, pentafluorophenyl, p-trifluoromethylphenyl, 3,5-dimethylphenyl, and 3,5-dichlorophenyl; 1-naphthyl; 2-naphthyl; and substituted 1- and 2-naphthyl. Typically aralkyl groups include, for example, benzyl, (4-methylphenyl)methyl-, (4-chlorophenyl)methyl-, (3-methylphenyl)methyl-, (4-cyanophenyl)methyl-, (4-methoxyphenyl)methyl-, 2-phenylethyl, 2-(4-cyanophenyl)methyl) ethyl- and 3-phenyl propyl.

Halogens include fluorine (F), chlorine (Cl), bromine (Br), and iodine (I). $R_1$ may be an acyl group, preferably an acyl group of seven or fewer carbon atoms such as acetyl, propionyl, or benzoyl. $R_1$ may be an alkyl sulfonyl or an aryl sulfonyl group, preferably of seven or fewer carbon atoms such as phenyl sulfonyl, 4-methylphenyl sulfonyl, methyl sulfonyl, and ethyl sulfonyl. $R_1$ may be nitro, carboxyl, trifluoromethyl, or cyano.

$R_1$ may be the atoms necessary to form a substituted or unsubstituted benzo group. When $R_1$ is the atoms necessary to form, for example, an unsubstituted 4,5-benzo group, the cation may have, for example, the structure:

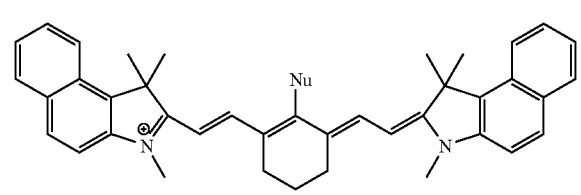

Compounds containing 2,3-benzo groups and compounds containing 3,4-benzo groups may also be prepared by the method of the invention. The benzo group may be unsubstituted or it may be substituted with one or more alkyl, alkoxy, carboxyl, nitro, cyano, trifluoromethyl, acyl, alkyl sulfonyl, aryl sulfonyl, or halogen groups, such as are described herein.

$R_2$ is alkyl, aryl, or aralkyl. These groups are described above.

Nu is halogen, or substituted or unsubstituted phenoxy, substituted or unsubstituted thiophenoxy, or substituted or unsubstituted diphenylamino. The phenoxy, thiophenoxy, and diphenylamino groups may be substituted with one of more alkyl, alkoxy, carboxyl, nitro, acyl, alkyl sulfonyl, aryl sulfonyl, trifluoromethyl, or halogen groups, such as are described above.

Y is O, S, NR', or C(R')$_2$, where R' is hydrogen or alkyl. Alkyl groups are described above. A preferred alkyl group is methyl.

m is zero or one.

n is two, three, or four, preferably two.

A is a group that contains n aromatic sulfonate groups. A may contain a single aromatic group such as single phenyl group or naphthyl group substituted with two to four sulfonate groups, preferably two sulfonate groups. Or A may contain two or more aromatic groups, attached by, for example, a carbon-carbon bond, such as in a polysulfonated biphenyl, for example, biphenyl-4,4'-disulfonate; an ether group, such as in a polysulfonated diphenyl ether, for example, diphenyl ether-4,4'-disulfonate; a C=C group, such as in a polysulfonated stilbene, for example, stilbene-2,2'-disulfonate; a carbonyl group, such as a polysulfonated benzophenone, for example, 2,2'-dihydroxy-4,4'-dimethoxybenzophenone-5,5'-disulfonate, or a urethane linkage. In either case, the aromatic group or groups may only be substituted with the sulfonyl groups, or they may contain one or more other substituents such as hydroxyl, alkoxy, acyl, or alkyl.

Representative aromatic groups that have n sulfonate groups are shown below. A preferred polysulfonate containing anion is the 4,5-dihydroxy-1,3-benzenedisulfonate anion.

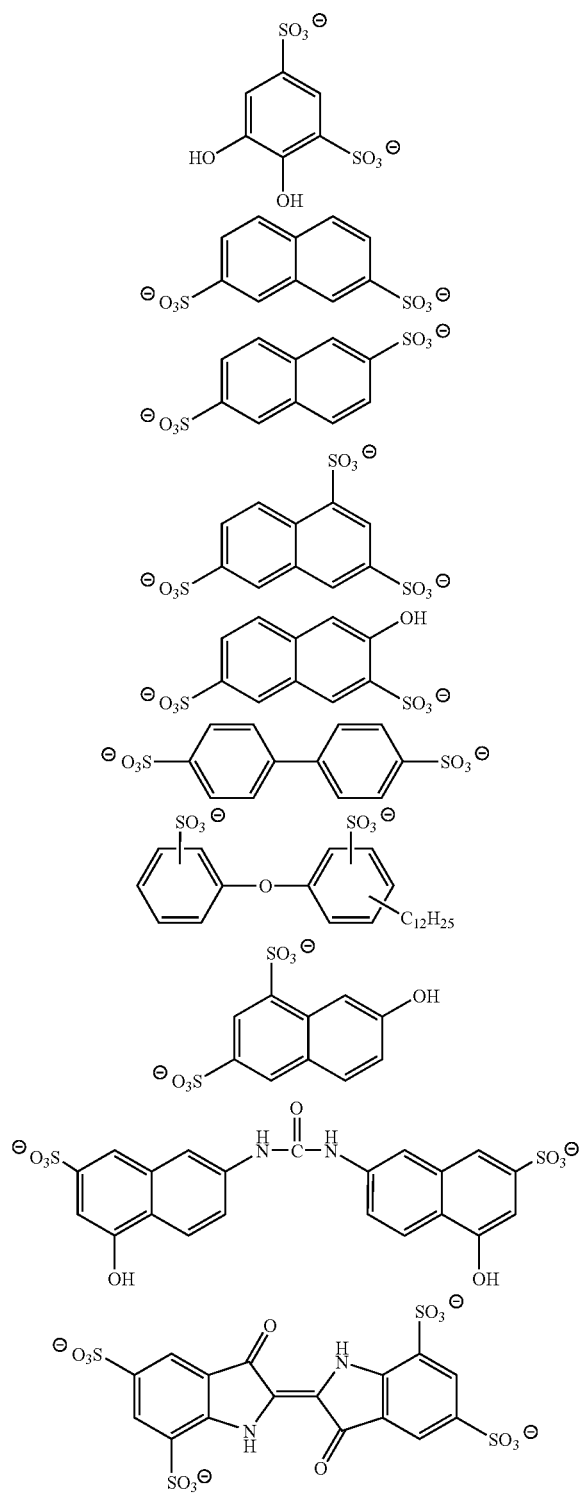

The overall reaction can be represented by the following, in which Nu is a substituted or unsubstituted phenoxy, thiophenoxy, or phenylamino anion.

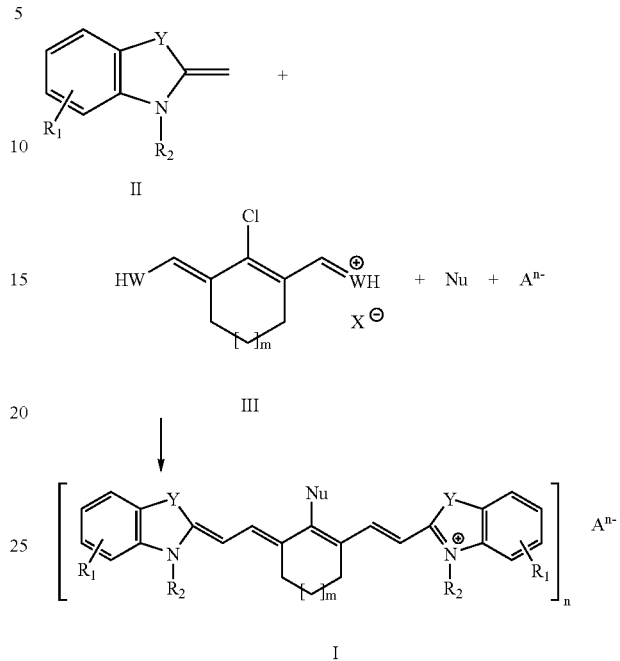

The first step is generally carried out by condensation of a heterocyclic base containing an activated methylene group with a compound of structure III in a solvent or solvent mixture at about 20–150° C. The heterocyclic base containing an activated methylene group is represented by Structure II, in which Y, $R_1$, and $R_2$ are as defined above.

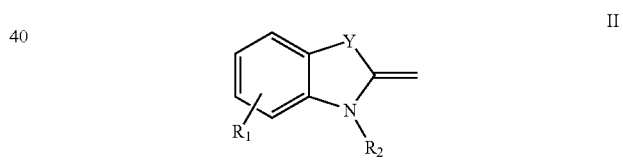

The heterocyclic base is selected to provide the $R_1$, Y, and $R_2$ groups desired in the final infrared absorbing cyanine dye. A useful compound of structure II is 1,3,3-trimethyl-2-methyleneindoline (Fischer's base) in which $R_1$ is hydrogen, $R_2$ is methyl, and Y is $C(CH_3)_2$. This compound has the structure:

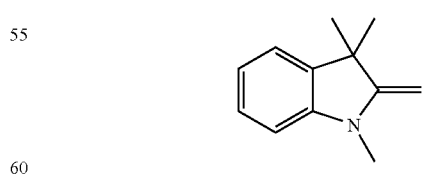

The method is a "one pot" synthesis of the infrared absorbing cyanine dyes. "One pot method" means that it is unnecessary to isolate and purify intermediates during the course of the reaction. All the reactions necessary for production of the infrared absorbing cyanine dye may be carried out in one reaction vessel without isolating any intermediate products.

Other examples of compounds of structure II include: 1-ethyl-3,3-dimethyl-2-methyleneindoline; 1-butyl-3,3-dimethyl-2-methyleneindoline; 5-chloro-1,3,3-trimethyl-2-methyleneindoline; 5,6-dichloro-1,3,3-trimethyl-2-methyleneindoline; 5-methoxy-1,3,3-trimethyl-2-methyleneindoline; 1,3,3,5,6-pentamethyl-2- methyleneindoline; 1-methyl-2-methylenebezoxazole; 5-methoxy-1-methyl-2-methylenebezoxazole; 5-methoxy-1-ethyl-2-methylenebezoxazole; 5-cyano-1-methyl-2-methylenebezoxazole; 1,3-dimethyl-2-methylenebenzimidazole; 1-methyl-2-methylenebenzothiazole; 5-chloro-1-methyl-2-methylenebenzothiazole; 1,3,3,-trimethyl-2-methylene 4,5-benzo-3H-indole; 1,3,3,-trimethyl-2-methylene 5,6-benzo-3H-indole; and 1,3,3,-trimethyl-2-methylene 6,7-benzo-3H-indole.

Compounds of structure III are those of the structure:

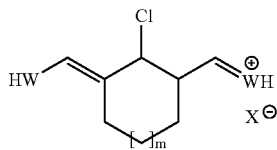

in which each W is independently 0 or Ar—N, Ar is an aromatic group, X is an anion such as chloride, and m is zero or one.

Useful compounds that have this structure are 2-chloro-1-formyl-3-hydroxymethylenecyclohexene monohydrochloride (the hydrochloride of Intermediate A) and N-[(3-(anilinomethylene)-2-chloro-1-cyclohexen-1-yl)methylene]aniline monohydrochloride (Intermediate B in which Ar is phenyl).

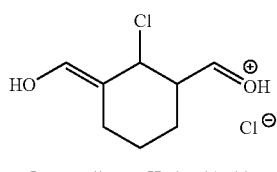

Intermediate A Hydrochloride

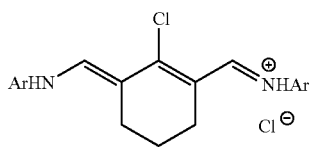

Intermediate B

Suitable solvents include alcohols, especially lower alcohols such as methanol, ethanol and n-propanol; acetic acid; and acetic anhydride.

The reaction may be carried out in the presence of a catalyst, such as sodium acetate. Alternatively, the reaction may be carried out without a catalyst. When no catalyst is used, water may removed from the reaction mixture with a water separator, such as with an azeotrope using a Dean-Stark trap.

After initial reaction to form an intermediate containing a chloro-substituted infrared absorbing cyanine cation, if desired, the chloro group may be replaced by a substituted or unsubstituted phenoxy, thiophenoxy, or diphenylamino group. The reaction can proceed from the previous step by directly adding a nucleophile such as a substituted or unsubstituted sodium phenolate or sodium thiophenolate directly to the reaction mixture, without separating and isolating the intermediate containing the chloro-substituted cyanine cation.

Finally, the infrared absorbing cyanine dye may be obtained by adding a water soluble or water/alcohol soluble salt, such as a sodium, potassium, lithium, ammonium, or substituted ammonium salt, containing the polysulfonate anion in water or water/alcohol mixture, again without separating the intermediate from the previous step. The infrared absorbing cyanine dye with the polysulfonate anion precipitates and may be isolated by filtration and dried. If desired, the infrared absorbing cyanine dye may be purified by recrystallization from an appropriate solvent, such as, for example, ethyl acetate or methyl ethyl ketone/ethyl acetate.

Infrared absorbing cyanine dyes that may be prepared by the method of the invention include, for example, 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-indolium, salt with 2,2'-dihydroxy-4,4'-dimethoxybenzophenone-5,5'-disulfonic acid (2:1); 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-3H-indolium, salt with 2,2'-dihydroxy-4,4'-dimethoxybenzophenone-5,5'-disulfonic acid (2:1); 2-[2-[3-[(1,3-dihydro-1,3,3-trimethyl-2H-indol-2-ylidene)ethylidene]-2-(4-methoxy-phenylthio)-1-cyclohexen-1-yl]ethenyl]-1,3,3-trimethyl-3H-indolium, salt with 2,2'-dihydroxy-4,4'-dimethoxybenzophenone-5,5'-disulfonic acid (2:1); 2-[2-[3-[(1,3-dihydro-1,3,3-trimethyl-2H-indol-2-ylidene)ethylidene]-2-diphenylamino-1-cyclohexen-1-yl]ethenyl]-1,3,3-trimethyl-3H-indolium, salt with 2,2'-dihydroxy-4,4'-dimethoxybenzophenone-5,5'-disulfonic acid (2:1); 2-[2-[3-[(1,3-dihydro-1,3,3-trimethyl-2H-indol-2-ylidene)ethylidene]-2-(4-methoxy-phenylthio)-1-cyclohexen-1-yl]ethenyl]-1,3,3-trimethyl-3H-indolium, salt with 4,5-dihydroxy-1,3-benzenedisulfonic acid (2:1); 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-indolium, salt with diphenylether-4,4'-disulfonic acid (2:1); 2-[2-[3-[(1,3-dihydro-1,3,3-trimethyl-2H-indol-2-ylidene)ethylidene]-2-(4-chloro-phenylthio)-1-cyclohexen-1-yl]ethenyl]-1,3,3-trimethyl-3H-indolium, salt with 2,2'-dihydroxy-4,4'-dimethoxybenzophenone-5,5'-disulfonic acid (2:1); 2-[2-[3-[(1,3-dihydro-1,3,3-trimethyl-2H-indol-2-ylidene)ethylidene]-2-phenylthio-1-cyclopenten-1-yl]ethenyl]-1,3,3-trimethyl-3H-indolium, salt with stilbene-2,2'-disulfonic acid (2:1); and 2-[2-[3-[(1,3-dihydro-1,3,3-trimethyl-2H-indol-2-ylidene)ethylidene]-2-phenylthio-1-cyclohexen-1-yl]ethenyl]-1,3,3-trimethyl-3H-indolium, salt with stilbene-2,2'-disulfonic acid (2:1).

Representative, non-limiting examples of infrared absorbing cyanine dyes that may be prepared by the method of the invention are shown below. As will be apparent to those skilled in the art, although each of the various representative cations shown has been shown with specific anions, each cation could be combined with other anions that contain more than one sulfonate group, such as, for example, with each of the anions mentioned or shown above.

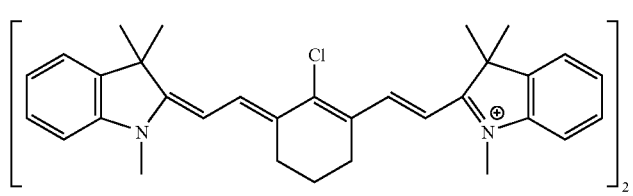 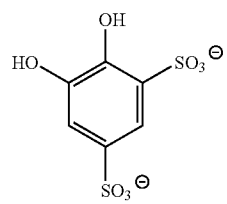
Compound 1
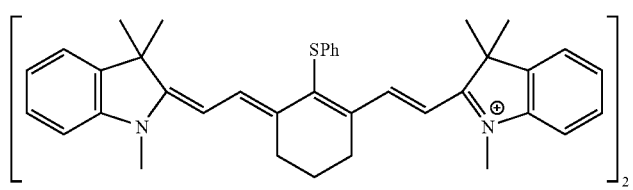 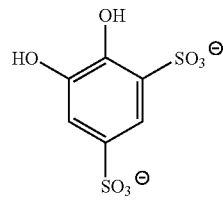
Compound 2
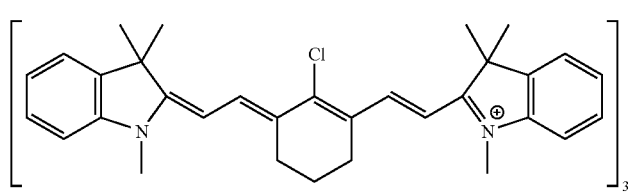 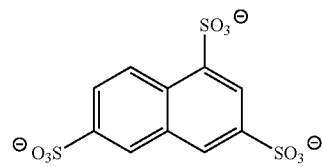
Compound 3
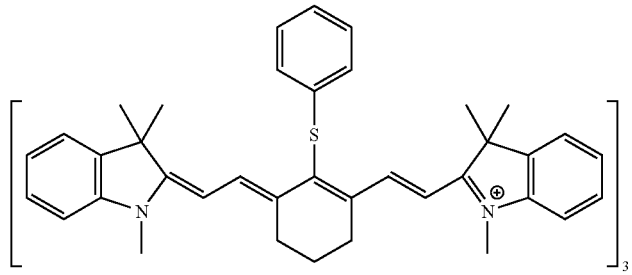 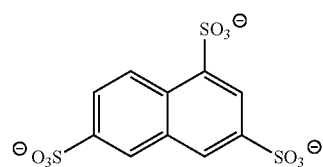
Compound 4
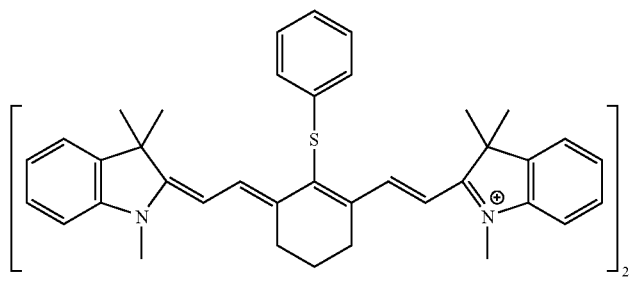 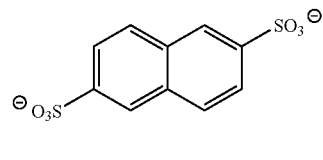
Compound 5
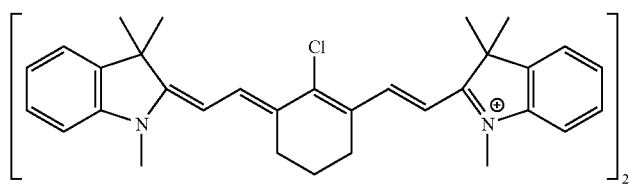 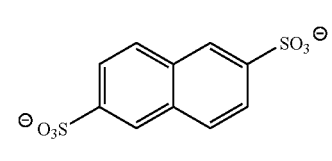
Compound 6

-continued
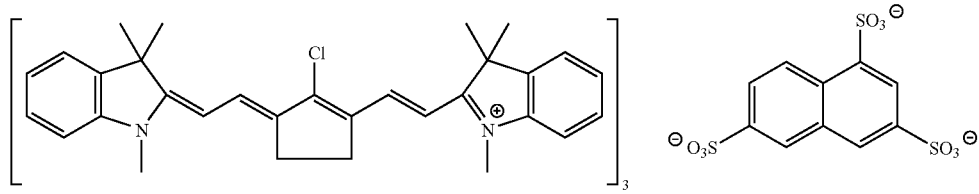
Compound 7
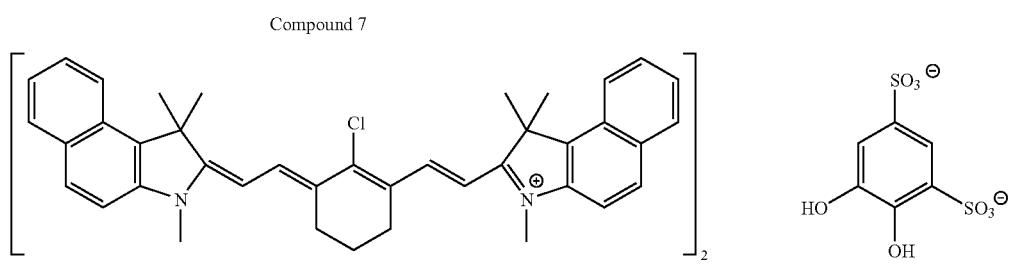
Compound 8
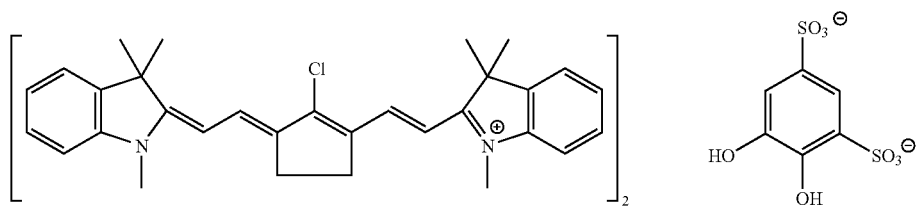
Compound 9
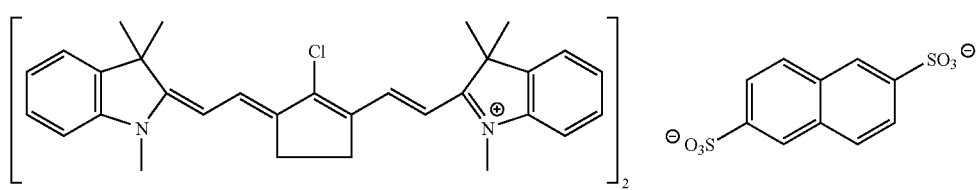
Compound 10
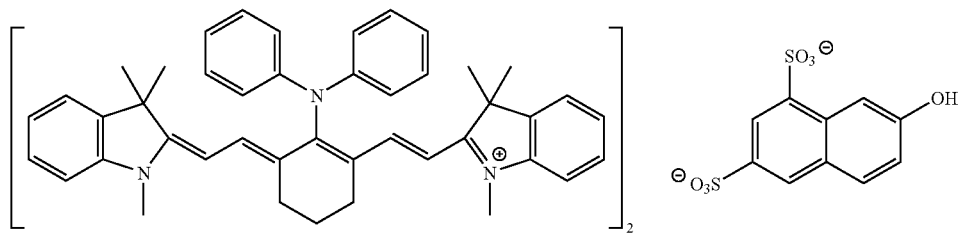
Compound 11
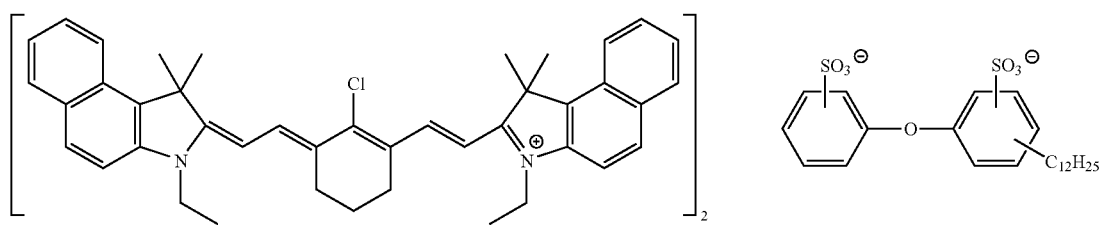
Compound 12

-continued
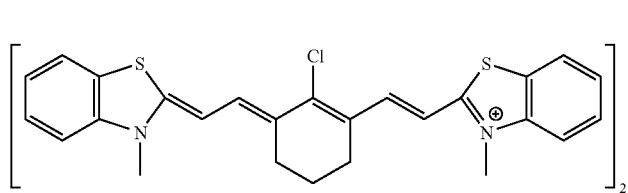 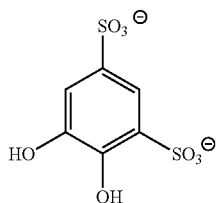
Compound 13
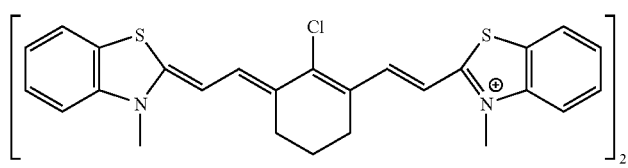 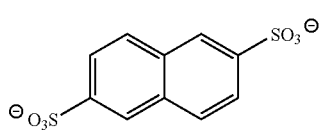
Compound 14
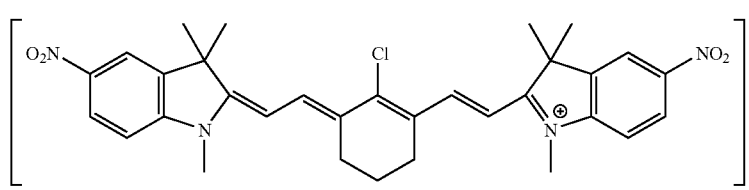 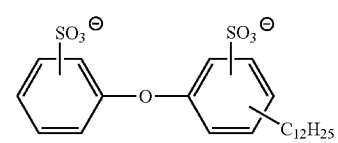
Compound 15
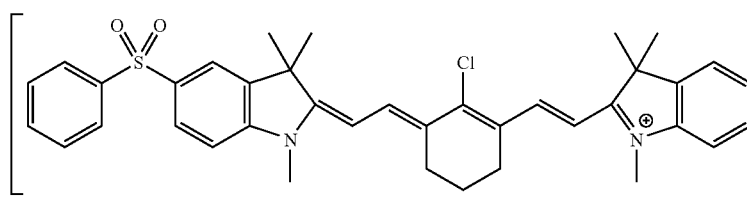 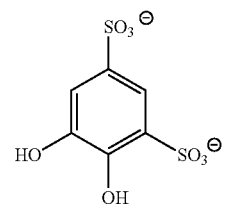
Compound 16
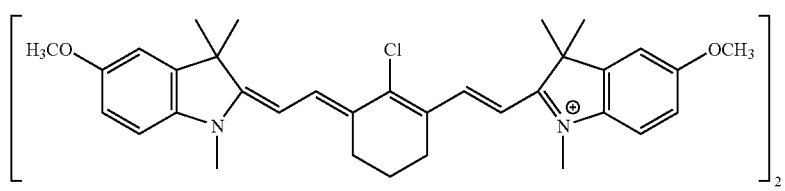 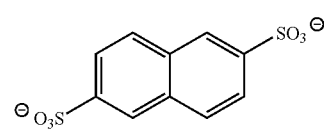
Compound 17
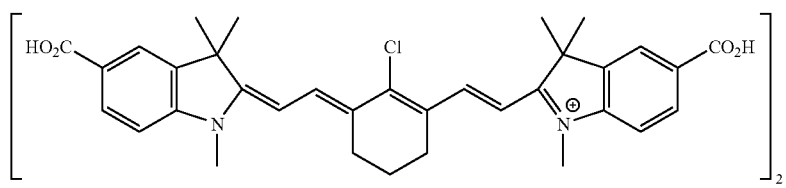 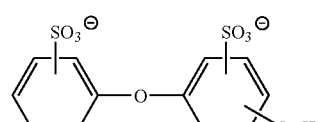
Compound 18
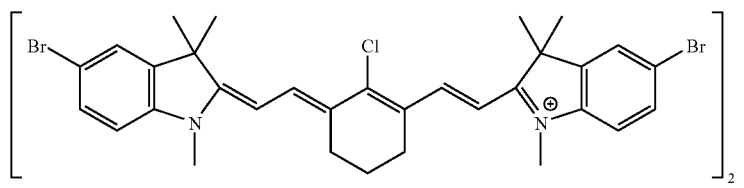 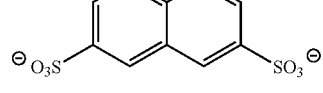
Compound 19

-continued
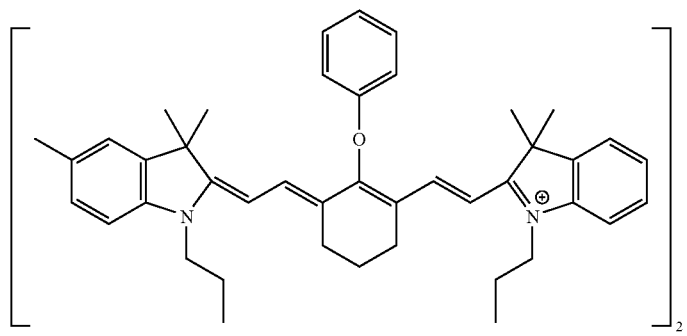
Compound 20
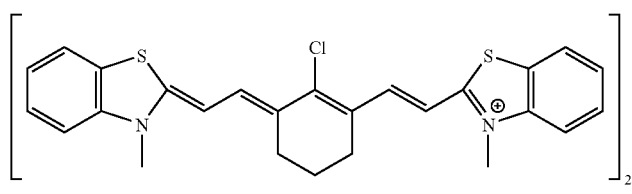
Compound 21
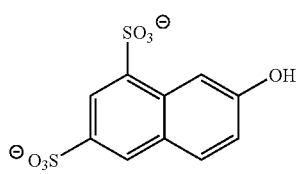
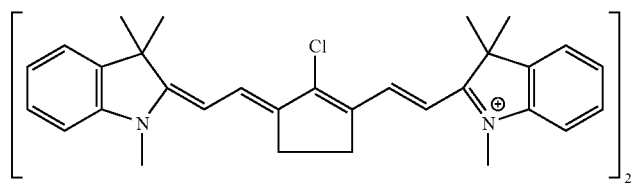
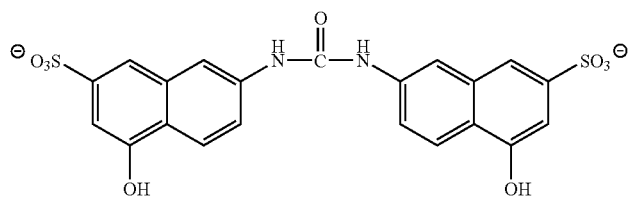
Compound 22
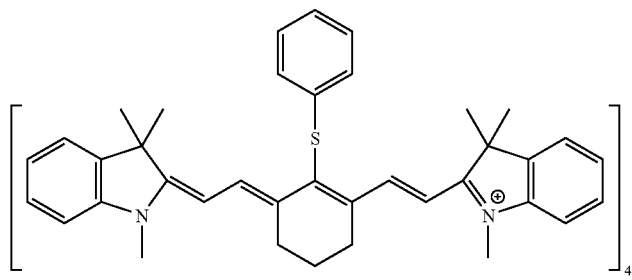
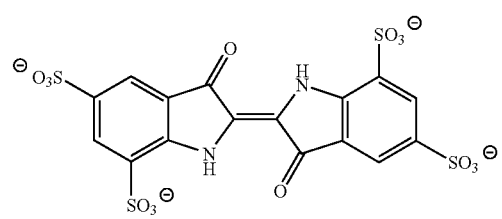
Compound 23

-continued

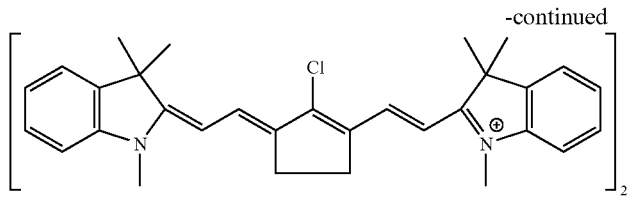

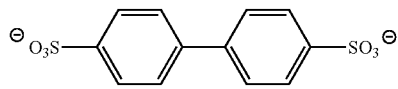

Compound 24

INDUSTRIAL APPLICABILITY

The infrared absorbing cyanine dyes prepared by the method of the invention may be used in imageable elements useful as lithographic printing plate precursors. As disclosed in U.S. patent application Ser. No. 10/384,989, filed Mar. 10, 2003, imageable elements that contain these dyes have improved dot stability following imaging.

Negative working imageable compositions are disclosed, for example, in Haley, U.S. Pat. No. 5,372,907; Nguyen, U.S. Pat. No. 5,919,601; Kobayashi, U.S. Pat. No. 5,965,319; Busman, U.S. Pat. No. 5,763,134; WO 00/17711, and U.S. patent application Ser. No. 10/155,696, filed May 24, 2002, the disclosures of which are all incorporated herein by reference. These precursors comprise an imageable layer over a lithographic substrate. The imageable layer comprises a photothermal conversion material, an acid generator, an acid activatable crosslinking agent, and a polymeric binder. The acid generators include precursors that form a Brönsted acid by thermally initiated decomposition. Non-ionic acid generators include haloalkyl-substituted s-triazines, such as 2-phenyl-4,6-bis(trichloromethyl)-s-triazine. Ionic acid generators include onium salts such as diphenyl iodonium chloride, triphenyl sulfonium hexafluoroantimonate, triphenyl sulfonium tetrafluoroborate, 2-methoxy-4-aminophenyl diazonium hexafluorophosphate, 4,4'-dicumyl iodonium p-tolyl sulfate, and 2-methoxy-4-(phenylamino)-benzenediazonium octyl sulfate. Haley, U.S. Pat. No. 5,372,907, discloses a radiation-sensitive composition in which a novolac resin is the polymeric binder and a resole resin is the acid activatable crosslinking agent. Nguyen, U.S. Pat. No. 5,919,601, discloses radiation-sensitive compositions in which the polymeric binder contains reactive pendant groups selected from hydroxy, carboxylic acid, sulfonamide, and alkoxymethylamides; and the polymeric resin is a resole resin, a $C_1$–$C_5$ alkoxymethyl melamine or glycoluril resin, a poly($C_1$–$C_5$-alkoxy-methylstyrene), a poly($C_1$–$C_5$-alkoxymethylacrylamide), a derivative thereof, or a combination thereof.

The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, is typically used for imaging. Imaging is conveniently carried out with a laser emitting at about 830 nm, about 1056 nm, or about 1064 nm. Suitable commercially available imaging devices include image setters such as the CREO® Trendsetter (Creo, Burnaby, British Columbia, Canada), the Screen PlateRite model 4300, model 8600, and model 8800 (Screen, Rolling Meadows, Chicago, Ill., USA), and the Gerber Crescent 42T (Gerber). After the imaging, the imaged element may be heated in an oven to about 110° C. to 150° C. for about one to five minutes. The imaged element, which comprises a latent image made up of imaged and unimaged regions, is developed to produce an image. Development may be carried out using high pH developers (pH of at least about 11) or with a solvent based developer. Following development, the printing plate is rinsed with water and dried. A gumming solution that contains a water-soluble polymer such as gum arabic may be applied to the resulting developed image.

Once the imageable element has been imaged and processed to form a printing plate, printing can be carried out by applying a fountain solution and then a lithographic ink to the image on its surface. Fountain solution is taken up by the surface of the substrate exposed by imaging and development, and the ink is taken up by the complementary regions. The ink is transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

Unless otherwise specified, all percentages are percentages by weight.

GLOSSARY

DMF N,N-dimethylformamide
Fisher's base 1,3,3-trimethyl-2-methyleneindoline; CAS# 118-12-7 (TCI America, Portland, Oreg., USA))
Intermediate A 2-chloro-1-formyl-3-hydroxymethylenecyclohexene
Intermediate B N-[(3-(anilinomethylene)-2-chloro-1-cyclohexen-1-yl)methylene]aniline monohydrochloride Example 1

This example illustrates preparation of 2-chloro-1-formyl-3-hydroxymethylenecyclohexene (Intermediate A).

19

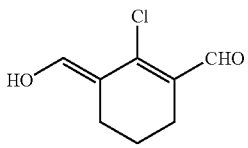

80 ml of DMF was placed in a 500 ml round bottom flask equipped with a magnetic stirrer, a nitrogen gas inlet, a condenser, a thermometer and a pressure-equalizing additional funnel. The flask was cooled in an ice-water bath and 74 ml of phosphorous oxychloride was slowly added to the DMF while the reaction temperature was maintained between 10 and 15° C. for one hour. Upon the completion of the addition, the reaction mixture was allowed to warm to room temperature for 30 minutes. A mixture of 20 g of cyclohexanone and 100 ml of DMF was slowly added to the flask, and the reaction temperature was maintained between 40 and 50° C. The mixture was heated at 55° C. for 3 hours in a water bath, and was then slowly poured into a mixture of 600 g of ice and 400 g of water. After the reaction mixture was stirred for about 15 h, the precipitate was filtered and washed with water until a neutral filtrate was obtained. The resulting yellow solid was collected and dried at ambient temperature in the dark overnight. The yield was 26 g.

Example 2

This example illustrate preparation of N-[(3-(anilinomethylene)-2-chloro-1-cyclohexen-1-yl)methylene]aniline monohydrochloride (Intermediate B).

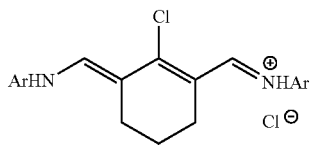

A solution containing 30 g of aniline dissolved in 150 ml of ethanol was slowly added into a solution containing 25 g of Intermediate A in 100 ml of DMF and 37.5 ml of concentrated hydrochloric acid (Note: mixing hydrochloric acid with DMF is highly exothermic!). The reaction temperature was maintained around 15–20° C. with an ice-water bath during the addition of aniline. After the reaction mixture was stirred for an additional 20 minutes, it was poured, with stirring, into 1 L of water and stirring continued for another 20 minutes. The deep-brown solid was collected by filtration and dried at ambient temperature overnight. Yield: 46 g.

Example 3

This example illustrates the one pot synthesis of 2-[2-[2-chloro-3-[(1,3-dihydro-1,3,3-trimethyl-2H-indol-2-ylidene) ethylidene]-1-cyclohexen-1-yl]ethenyl]-1,3,3-trimethyl-3H-Indolium, salt with 4,5-dihydroxy-1,3-benzenedisulfonic acid (2:1) (Compound 1) from intermediate A.

In a 250 ml flask equipped with a stirring bar and a condenser, 6.6 g of Fisher's base, 3.3 g of intermediate A, 2.0 g of sodium acetate, 3 ml of 36.5% hydrochloric acid and 50 ml of ethanol were stirred in an oil bath at 70° C. for 6 h. The reaction mixture was cooled to room temperature and

20 mixed with 50 g of water. The resulting dark-green solution was then added to a solution containing 5.0 g of disodium 4,5-dihydroxy-1,3-benzenedisulfonic acid (from Aldrich) in 500 g of water and 100 g of ethanol. The resulting precipitate was collected by filtration, recrystallized from methyl ethyl ketone/ethyl acetate, and dried in vacuum at ambient temperature overnight. Yield: 4.8 g.

Proton NMR (in DMSO-$d_6$): delta: 1.66 (24H, s), 1.86 (4H, br), 2.71 (8H, t), 3.68 (12H, s), 6.30 (4H, d), 6.97 (1H, s), 7.20–7.35 (5H, m), 7.35–7.50 (8H, m), 7.62 (4H, d), 8.25 (4H, d), 8.88 (1H, s), and 10.60 (1H, s).

Example 4

This example illustrates the one pot synthesis of 2-[2-[2-chloro-3-[(1,3-dihydro-1,3,3-trimethyl-2H-indol-2-ylidene) ethylidene]-1-cyclohexen-1-yl]ethenyl]-1,3,3-trimethyl-3H-Indolium, salt with 4,5-dihydroxy-1,3-benzenedisulfonic acid (2:1) (Compound 1) from intermediate B.

In a 250 ml flask equipped with a stirring bar and a condenser, 2.7 g of intermediate B, and 2.6 g of Fisher's base was stirred with 75 g of ethanol in a 70° C. oil bath for 4 h. The reaction mixture was cooled to room temperature and was mixed 80 g of water. The resulting dark-green solution was then added to a 1-l container containing 1.4 g of disodium 4,5-dihydroxy-1,3-benzenedisulfonic acid (Aldrich) in 20 g of water and 20 g of ethanol. The precipitate was collected by filtration and dried in vacuum at room temperature overnight. Yield: 3.8 g. The dye can be further purified by recrystallization from methyl ethyl ketone/ethyl acetate.

Proton NMR (in DMSO-$d_6$): delta: 1.67 (24H, s), 1.86 (4H, br), 2.72 (8H, t), 3.68 (12H, s), 6.30 (4H, d), 6.97 (1H, s), 7.20–7.35 (5H, m), 7.35–7.50 (8H, m), 7.63 (4H, d), 8.25 (4H, d), 8.88 (1H, s) and 10.58 (1H, s).

Example 5

This example illustrates the one pot synthesis of 2-[2-[3-[(1,3-dihydro-1,3,3-trimethyl-2H-indol-2-ylidene)ethylidene]-2-phenylthio-1-cyclohexen-1-yl]ethenyl]-1,3,3-trimethyl-3H-indolium, salt with 4,5-dihydroxy-1,3-benzenedisulfonic acid (2:1) (Compound 2) from intermediate A.

In a 250 ml flask equipped with a stirring bar and a condenser, 6.6 g of Fisher's base (from TCI America), 3.3 g of intermediate A, 2.0 g of sodium acetate, 3 ml of 36.5% hydrochloric acid and 50 ml of ethanol were stirred in a oil bath at 70° C. for 7 h. The reaction mixture was cooled to room temperature. A solution containing 7.7 g of ethanol, 0.6 g of NaOH and 1.7 g of thiophenol was added to the reaction mixture and stirring was continued for another 15 h. The resulting dark-green solution was then added to a solution containing 5.0 g of disodium 4,5-dihydroxy-1,3-benzenedisulfonic acid (from Aldrich) in 500 g of water and 100 g of ethanol. The resulting precipitate was collected by filtration, recrystallized in methyl ethyl ketone/ethyl acetate, and dried in vacuum at room temperature overnight. Yield: 7.1 g.

Proton NMR (in DMSO-$d_6$): delta: 1.42 (24H, s), 1.92 (4H, br), 2.76 (8H, t), 3.63 (12H, s), 6.31 (4H, d), 6.98 (1H, s), 7.05-7.45 (23H, m), 7.52 (4H, d), 8.61 (4H, d), 8.87 (1H, s) and 10.61 (1H, s).

Example 6

This example illustrates the one pot synthesis of 2-[2-[3-[(1,3-Dihydro-1,3,3-trimethyl-2H-indol-2-ylidene)ethylidene]-2-phenylthio-1-cyclohexen-1-yl]ethenyl]-1,3,3-trimethyl-3H-indolium, salt with 4,5-dihydroxy-1,3-benzenedisulfonic acid (2:1) (Compound 2) from intermediate B.

In a 500 ml flask equipped with a stirring bar and a condenser, 10.9 g of Intermediate B and 10.5 g of Fisher's base was stirred with 300 g of ethanol in a 70° C. water bath for 4 h. After cooling to room temperature, the reaction mixture was mixed with a solution containing 15.5 g of ethanol, 1.2 g of NaOH and 3.3 g of thiophenol and stirred for another 15 h. The mixture was then poured into a 4-l container containing 300 ml water and 10 g concentrated hydrochloric acid while stirring. 2-L water at about 42° C. followed by a solution of 10 g of disodium 4,5-dihydroxy-1,3-benzenedisulfonic acid (Aldrich) in 100 g of water was added to the reaction mixture while stirring. The resulting precipitate was collected by filtration and dried in vacuum at room temperature overnight. Yield: 18.7 g of maroon dye.

Proton NMR (in DMSO-$d_6$): delta: 1.41 (24H, s), 1.92 (4H, br), 2.76 (8H, t), 3.64 (12H, s), 6.30 (4H, d), 6.98 (1H, s), 7.05–7.45 (23H, m), 7.52 (4H, d), 8.60 (4H, d), 8.87 (1H, s) and 10.58 (1H, s).

Example 7

This example illustrates the one pot synthesis of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-Indolium, salt with 4,5-dihydroxy-1,3-benzenedisulfonic acid (2:1) (Compound 1) from intermediate A, without a catalyst.

In a 250 ml flask equipped with a stirring bar and a condenser attached to a Dean-Stark trap, 11.8 g of Fisher's base, 3.45 g of intermediate A, 5.0 g of 36.5% hydrochloric acid, 50 ml of benzene and 100 ml of n-propanol were heated at reflux in an oil bath heated at 100° C. for 3 h. After 3 h, no further water was collected in the Dean-Stark trap. The reaction flask was attached to a rotary evaporator and the solvents evaporated. The residual green material was dissolved in 150 g of ethanol and 150 g of water was added. The resulting dark-green solution was then added drop-wise to a solution containing 10 g of disodium 4,5-dihydroxy-1,3-benzenedisulfonic acid (from Aldrich) in 50 g of water and 50 g of ethanol while stirring. The resulting precipitate was collected by filtration, washed with 2×50 ml of ethyl acetate, and dried at ambient temperature overnight. Yield: 11.5 g.

Proton NMR (in DMSO-$d_6$): delta: 1.66 (24H, s), 1.86 (4H, br), 2.71 (8H, t), 3.68 (12H, s), 6.30 (4H, d), 6.97 (1H, s), 7.20–7.35 (5H, m), 7.35–7.50 (8H, m), 7.62 (4H, d), 8.25 (4H, d), 8.88 (1H, s), and 10.60 (1H, s).

Having described the invention, we now claim the following and their equivalents.

What is claimed is:

1. A method for preparing infrared absorbing cyanine dyes of the structure:

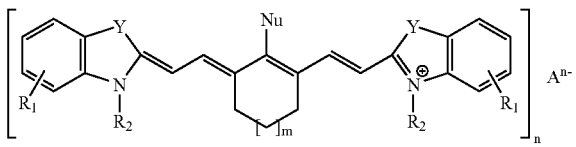

in which:
$R_1$ is hydrogen, or $R_1$ is one or more alkyl, alkoxy, carboxyl, nitro, cyano, trifluoromethyl, acyl, alkyl or aryl sulfonyl, or halogen groups, or $R_1$ is the atoms necessary to form a substituted or unsubstituted benzo group;
$R_2$ is alkyl, aryl, or aralkyl;
Nu is halogen, substituted or unsubstituted phenoxy, substituted or unsubstituted thiophenoxy, or substituted or unsubstituted diphenylamino;
Y is O, S, NR', or C(R')$_2$, where R' is hydrogen or alkyl;
m is zero or one;
n is two, three, or four; and
A is an aromatic group that has n sulfonate groups;
the method comprising the steps of:
a) reacting an activated methylene group containing a heterocyclic base of the structure:

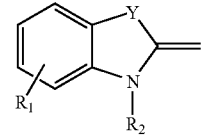

with a compound of the structure:

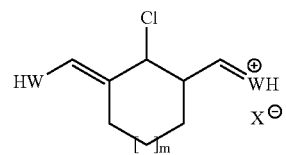

and forming an intermediate in a reaction mixture;
in which W is O or Ar—N, Ar is an aromatic group, X$^-$ is an anion, and m is zero or one, and
b) adding a salt of A to the reaction mixture; and
c) isolating the infrared absorbing cyanine dye;
in which the infrared absorbing cyanine dye is the only compound isolated in the method.

2. The method of claim 1 in which $R_1$ is hydrogen; $R_2$ is methyl, ethyl, n-propyl, or n-butyl; Nu is chloro, phenoxy, thiophenoxy, or diphenyl amino; and Y is C(CH$_3$)$_2$, O, or S.

3. The method of claim 2 in which A is selected from the group consisting of biphenyl-4,4'-disulfonate; diphenyl ether-4,4'-disolfonate; stilbene-2,2'-disulfonate; 2,2'-dihydroxy-4,4'-dimethoxybenzophenone-5,5'-disulfonate,

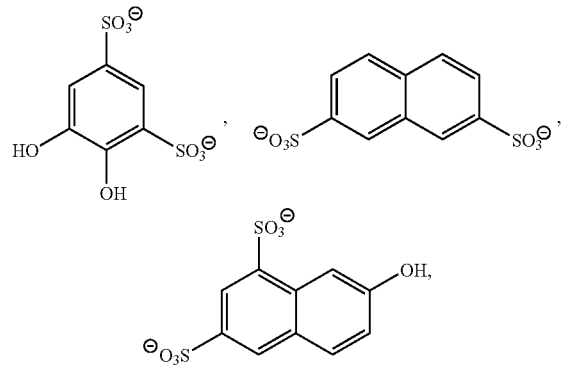

-continued

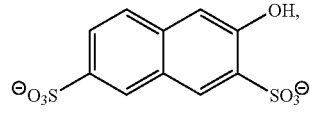

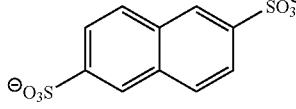

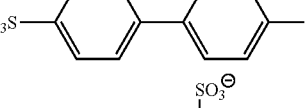

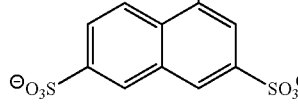

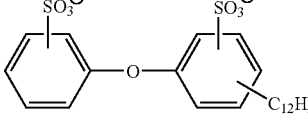

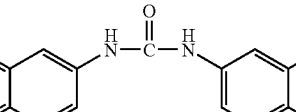, and

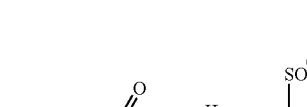

4. The method of claim 2 in which n is 2 and A is 4,5-dihydroxy-1,3-benzenedisulfonate.

5. The method of claim 1 in which Nu is chloro.

6. The method of claim 5 in which $R_1$ is hydrogen; $R_2$ is methyl, ethyl, n-propyl, or n-butyl; and Y is $C(CH_3)_2$, O, or S.

7. The method of claim 6 in which n is 2 and A is 4,5-dihydroxy-1,3-benzenedisulfonate.

8. The method of claim 7 in which Y is $C(CH_3)_2$.

9. The method of claim 8 in which n is 2 and A is 4,5-dihydroxy-1,3-benzenedisulfonate.

10. The method of claim 1 additionally comprising, after step a) and before step b), an additional step of adding a substituted or unsubstituted phenoxy, a substituted or unsubstituted thiophenoxy, or a substituted or unsubstituted diphenylamino compound to the reaction mixture.

11. The method of claim 10 in which $R_1$ is hydrogen; $R_2$ is methyl, ethyl, n-propyl, or n-butyl; Nu is phenoxy, thiophenoxy, or diphenyl amino; and Y is $C(CH_3)_2$O, or S.

12. The method of claim 11 in which A is 4,5-dihydroxy-1,3-benzenedisulfonate.

13. The method of claim 12 in which Y is $C(CH_3)_2$.

14. The method of claim 13 in which n is 2 and A is 4,5-dihydroxy-1,3-benzenedisulfonate.

15. The method of claim 1 in which the dye is isolated by filtration.

16. The method of claim 15 in which $R_1$ is hydrogen; $R_2$ is methyl, ethyl, n-propyl, or n-butyl; Nu is chloro, phenoxy, thiophenoxy, or diphenyl amino; and Y is $C(CH_3)_2$, O, or S.

17. The method of claim 16 in which A is 4,5-dihydroxy-1,3-benzenedisulfonate.

18. The method of claim 1 in which:
$R_1$ is hydrogen; $R_2$ is methyl, ethyl, n-propyl, or n-butyl; Nu is chloro; Y is $C(CH_3)_2$, O, or S; and A is 4,5-dihydroxy-1,3-benzenedisulfonate; and
the method consists essentially of steps a), b), and c).

19. The method of claim 1 in which:
$R_1$ is hydrogen; $R_2$ is methyl, ethyl, n-propyl, or n-butyl; Nu is phenoxy, thiophenoxy, or diphenyl amino; $R_2$ is methyl, ethyl, n-propyl, or n-butyl; Y is $C(CH_3)_2$, O, or S; and A is 4,5-dihydroxy-1,3-benzenedisulfonate; and
the method consists essentially of steps a), b), c), and an additional step of adding a substituted or unsubstituted phenoxy, a substituted or unsubstituted thiophenoxy, or a substituted or unsubstituted diphenylamino compound to the reaction mixture.

* * * * *